(12) United States Patent
Yamaguchi et al.

(10) Patent No.: US 7,746,627 B2
(45) Date of Patent: Jun. 29, 2010

(54) PORTABLE ELECTRONIC APPARATUS WITH IMPROVED AUDIO QUALITY THROUGH A CURVED AND SLOPED SURFACE OF A HOUSING

(75) Inventors: Koichi Yamaguchi, Kanagawa (JP); Toshiharu Tajiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/489,899

(22) Filed: Jun. 23, 2009

(65) Prior Publication Data
US 2009/0262491 A1    Oct. 22, 2009

Related U.S. Application Data

(63) Continuation of application No. 11/842,591, filed on Aug. 21, 2007, now Pat. No. 7,576,983.

(30) Foreign Application Priority Data

Sep. 12, 2006    (JP) .............................. 2006-247234

(51) Int. Cl.
*H05K 5/00* (2006.01)
*G06F 1/16* (2006.01)

(52) U.S. Cl. .............................. 361/679.2; 361/679.23; 181/150; 381/333

(58) Field of Classification Search ............ 361/679.02, 361/679.08, 679.09, 679.23, 679.55, 679.4; 181/150, 155; 381/333, 331, 388
See application file for complete search history.

(56) References Cited

U.S. PATENT DOCUMENTS

| | | | |
|---|---|---|---|
| 2,643,727 A * | 6/1953 | Leon | ........................... 181/155 |
| 4,588,042 A | 5/1986 | Palet et al. | |
| 4,696,370 A | 9/1987 | Tokumo et al. | |
| 5,917,695 A | 6/1999 | Youn | |
| 6,009,972 A | 1/2000 | Choi et al. | |
| 6,335,974 B1 * | 1/2002 | Kunimoto | ................... 381/306 |
| 6,415,035 B1 | 7/2002 | Shin et al. | |
| 6,491,552 B2 | 12/2002 | Horikoshi et al. | |
| 6,807,053 B2 | 10/2004 | An et al. | |
| 6,918,462 B2 | 7/2005 | Benkler | |
| 7,093,688 B2 | 8/2006 | Lee | |
| 7,200,000 B1 | 4/2007 | Huang | |
| 7,364,009 B2 | 4/2008 | Sperle et al. | |

OTHER PUBLICATIONS

Empowered by Innovation NEC Brochure. "LaVie". http://121ware.com/personal/ and http://www.microsoft.com/piracy/howtotell, pp. 1-24.

* cited by examiner

*Primary Examiner*—Michael C Zarroli
(74) *Attorney, Agent, or Firm*—Oblon, Spivak, McClelland, Maier & Neustadt, L.L.P.

(57) ABSTRACT

A portable electronic apparatus includes a housing and an output device configured to output sound. The output device is disposed on a surface on an inside of a slope disposed on a lower surface of the housing, the slope resulting in the housing being opened in a predetermined direction. The slope forms a space between the slope and a mounting surface on which the housing is placed. The surface on the inside of the slope includes a curved surface. The curved surface may be concavely curved relative to the bottom surface of the housing. The electronic apparatus may also include an input device, and the output device may be disposed on a side forward of the input device.

4 Claims, 6 Drawing Sheets

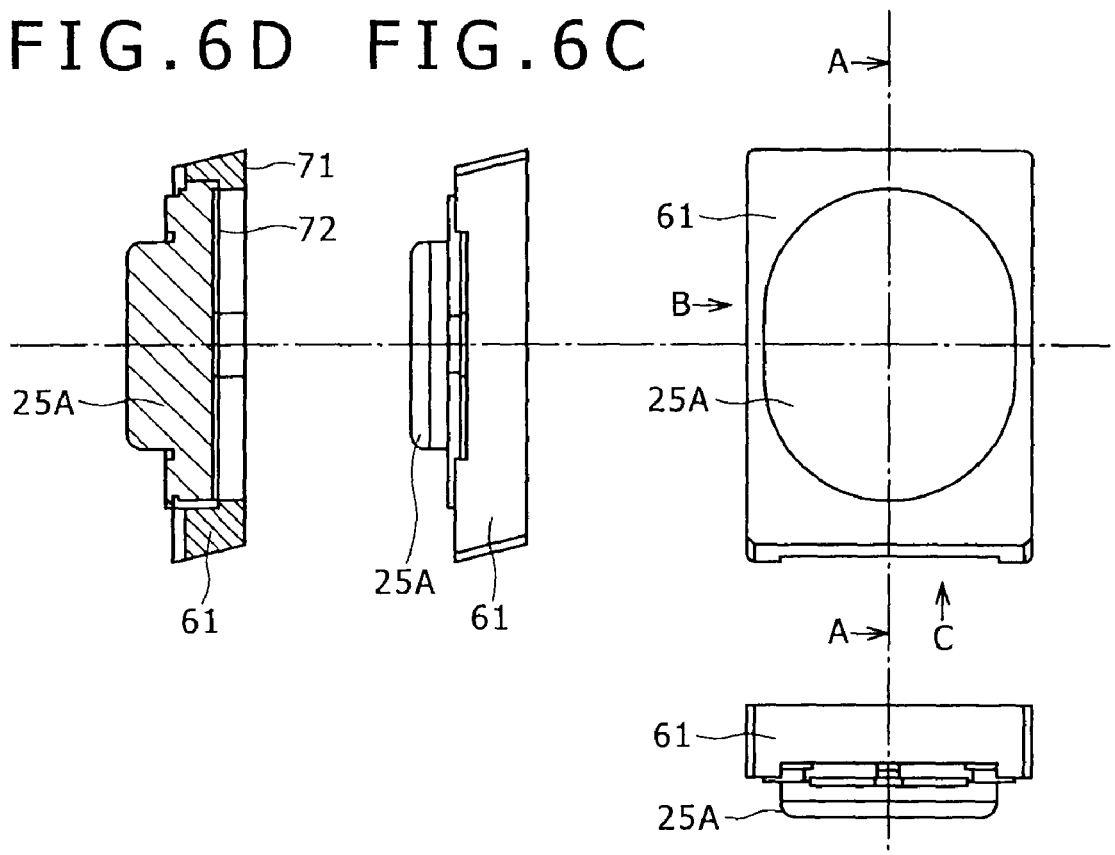

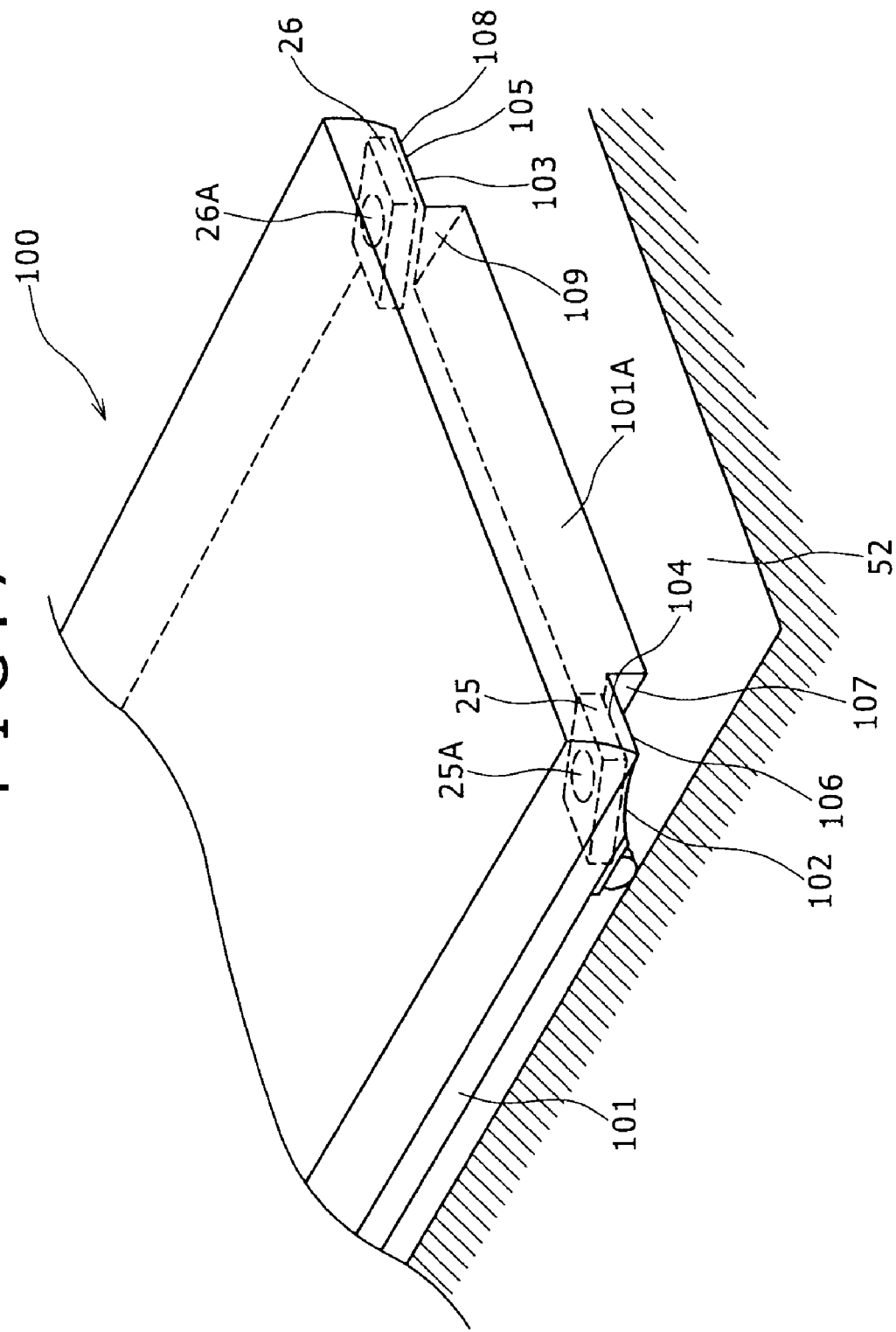

PORTABLE ELECTRONIC APPARATUS WITH IMPROVED AUDIO QUALITY THROUGH A CURVED AND SLOPED SURFACE OF A HOUSING

CROSS REFERENCES TO RELATED APPLICATIONS

This application is a continuation of and claims the benefit of priority from U.S. Ser. No. 11/842,591, filed Aug. 21, 2007, which claims the benefit of priority from Japanese Patent Application JP 2006-247234 filed in the Japan Patent Office on Sep. 12, 2006, the entire contents of each being incorporated herein by reference.

BACKGROUND

1. Field of the Invention

The present invention relates generally to electronic apparatuses and, more particularly, to an electronic apparatus that can provide users with good quality sound when a speaker or the like that outputs sound is disposed on a lower surface of the apparatus.

2. Description of the Related Art

Notebook personal computers (hereinafter referred to as "notebook PCs") and other portable electronic apparatuses are lately in widespread use. Such portable electronic apparatuses very often include a speaker for outputting sound. The speaker is typically mounted at different locations.

For example, an apparatus including a speaker disposed in a cabinet is known. In this known apparatus, in order to output sound in a low pitch region, the cabinet is disposed movably in housing between a first position, at which the cabinet is stowed away in place in the housing, and a second position, at which the cabinet is withdrawn from the housing. When the cabinet is withdrawn from the housing to the second position, the cabinet forms a predetermined space below the speaker. (See, for example, Japanese Patent Laid-open No. 2001-119779.) From a design viewpoint, the speaker may be disposed on a lower surface of the housing.

SUMMARY

In an arrangement of a notebook PC, in which a speaker is disposed on a lower surface thereof, however, the sound outputted from the speaker is muffled because of no gap available between the lower surface and a PC mounting surface. It is therefore difficult to provide users with sound with a sufficiently good quality.

The present invention addresses the above-identified, and other problems associated with known apparatuses and it is desirable to provide the user with good quality sound when a speaker or other type of device outputting sound is disposed on the lower surface of the apparatus.

According to an embodiment of the present invention, there is provided a portable electronic apparatus (for example, a notebook PC 10 shown in FIG. 1) including a speaker (for example, a speaker unit 25 shown in FIG. 5) outputting sound.

The speaker is disposed on an inner surface (for example, a curved surface 53 shown in FIG. 5) of a slope (for example, a slope 51 shown in FIG. 5) included in a lower surface of housing (for example, second housing 12 shown in FIG. 5).

The slope results in the housing being opened in a predetermined direction (for example, in a forward direction), thereby allowing the housing to form a space between the housing and a housing mounting surface (for example, a mounting surface 52 shown in FIG. 5).

The portable electronic apparatus according to the embodiment of the present invention can provide the user with good quality sound when the speaker or the like that outputs sound is disposed on the lower surface of the apparatus.

BRIEF DESCRIPTION OF THE DRAWINGS

FIGS. 6A through 6D are views illustrating detailed arrangements near a speaker; and FIG. 7 is a perspective view showing housing of a notebook PC according to another embodiment of the present invention.

DETAILED DESCRIPTION OF THE PREFERRED EMBODIMENTS

The following is a detailed description of the embodiments according to the present invention. This description is intended to ensure that the embodiments according to the present invention conform to the specification and drawings therein. The embodiments may include those which have the constituents of the present invention which are not shown in the specification or the drawings therein. This does not necessarily mean that such embodiments do not correspond to the constituents of the present invention. Conversely, even though some embodiments may be written as conforming to the constituents of the present invention, it does not necessarily mean that such embodiments do not conform to other constituents than the constituents.

Specific embodiments to which the present invention is applied will be described in detail below with reference to the drawings.

Figure 1:
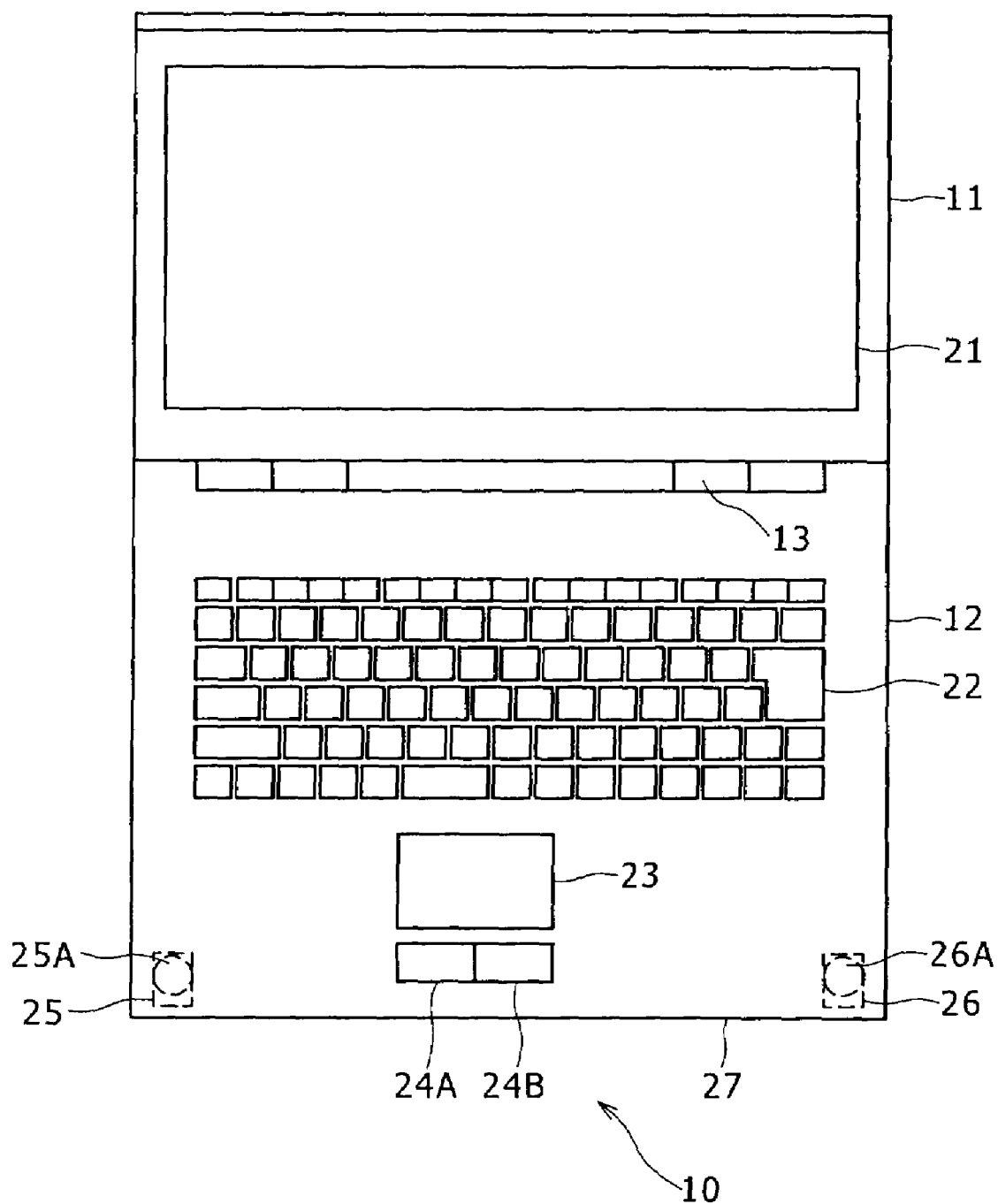
FIG. 1 is a top view showing a notebook PC according to an embodiment of the present invention.

FIG. 1 is a schematic view showing a notebook PC according to an embodiment of the present invention.

Descriptions given hereunder are based on the viewpoint of a user operating the notebook PC unless otherwise specified. Referring to FIG. 1, a left-and-right direction is crosswise direction; a front side is the side of a touch pad 23; a rear side is the side of a connection portion 13; a back surface of first housing 11 is upper surface; and a back surface of second housing 12 is lower surface.

Referring to FIG. 1, a notebook PC 10 is a foldable configuration including first housing 11 and second housing 12 that are connected by a connection 13 that includes a hinged structure journaled by a single shaft. FIG. 1 shows a condition, in which the first housing 11 and the second housing 12 are open to an angle of about 150 degrees via the connection 13. The first housing 11 includes a display 21 disposed at a center thereof. The display 21 shows an image or the like.

The second housing 12 includes a keyboard 22 disposed on an upper surface thereof in the rear side. The second housing 12 further includes a touch pad 23 and two click buttons 24A, 24B disposed thereon. The touch pad 23 serving as a pointing device is disposed on the front side of the keyboard 22. The click buttons 24A, 24B are disposed on the front side of the touch pad 23. The keyboard 22, the touch pad 23, and the click buttons 24A, 24B accept operation by the user.

A speaker unit 25 having therein a speaker 25A is disposed on an inside at the front left side of the second housing 12. Further, a speaker unit 26 having therein a speaker 26A is disposed on an inside at the front right side of the second housing 12. Arrangements of the speaker units 25, 26 will be described in detail later with reference to FIGS. 4 and 5.

Figure 2:
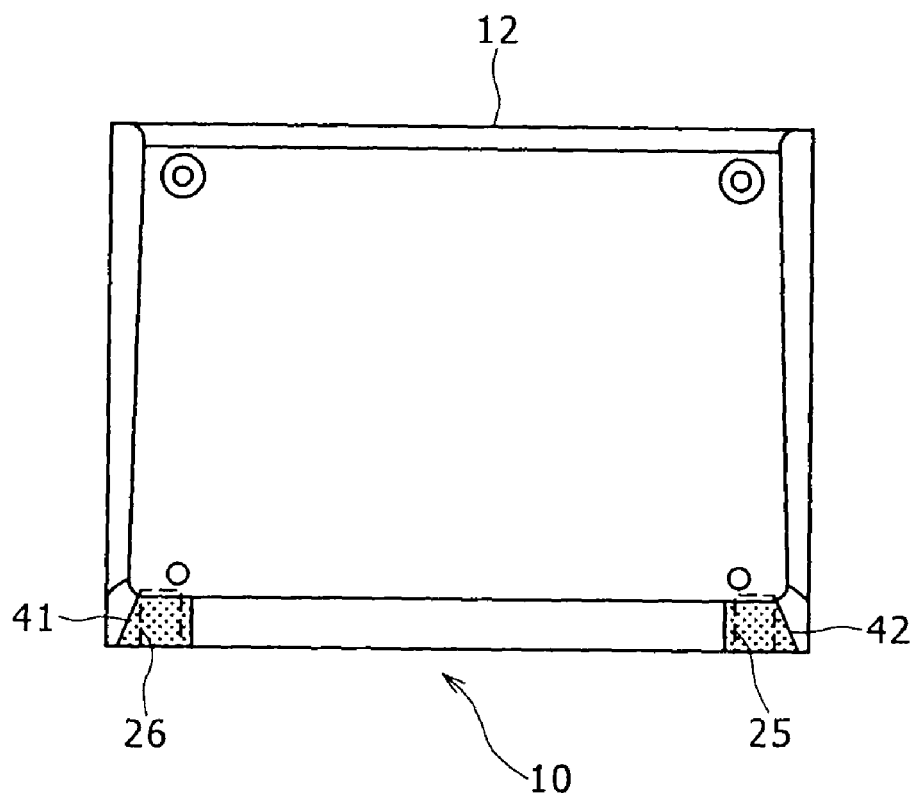
FIG. 2 is a bottom view showing the notebook PC.

FIG. 2 is a bottom view showing the notebook PC 10 shown in FIG. 1.

FIG. 2 shows the notebook PC 10 in a closed position.

Referring to FIG. 2, the second housing 12 of the notebook PC 10 includes a speaker grille 41 formed in a lower surface thereof. The speaker grille 41 is disposed at a position that corresponds to the speaker unit 26. The speaker grille 41 has a plurality of openings for outputting sound outputted from the speaker 26A to an external environment of the second housing 12. Similarly, a speaker grille 42 is disposed at a position corresponding to the speaker unit 25. Specifically, the notebook PC 10 has the speaker grilles 41, 42 disposed on the lower surface thereof that is invisible from the user during use. This adds to extra design value.

The sound outputted from the speaker 26A of the speaker unit 26 passes through the speaker grille 41 and is outputted to the external environment of the second housing 12. The sound outputted from the speaker 25A of the speaker unit 25, on the other hand, passes through the speaker grille 42 and is outputted to the external environment of the second housing 12.

Figure 3:
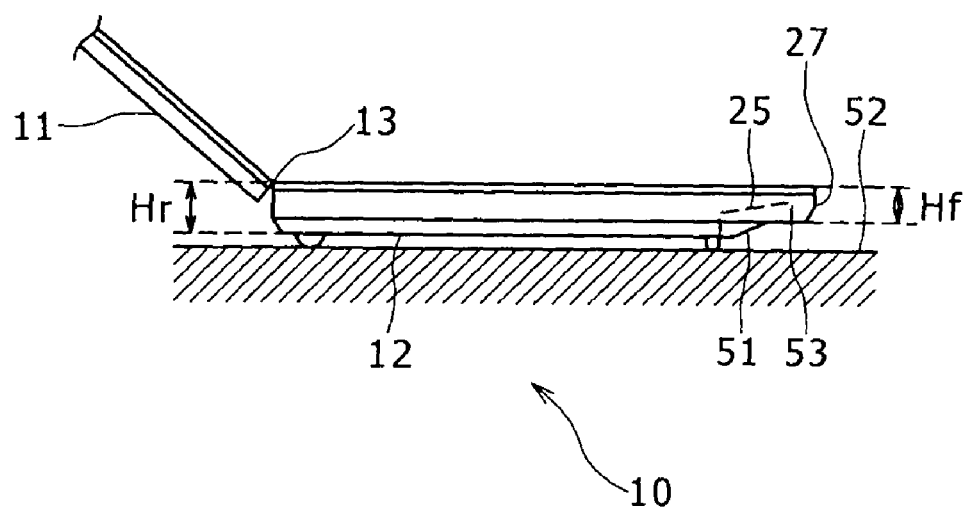
FIG. 3 is a side elevational view showing the notebook PC.

FIG. 3 is a left side elevational view showing the notebook PC 10 shown in FIG. 1.

FIG. 3 shows a condition, in which the first housing 11 and the second housing 12 are open to an angle of about 150 degrees via the connection 13.

Referring to FIG. 3, the second housing 12 includes a slope 51 disposed on the lower surface at the front side thereof. The slope 51 has a thickness that is varied gradually from a thickness Hr on the rear side of the second housing 12 to a thickness Hf that corresponds to a thickness at the front side (width of a front surface 27) thinner than the thickness Hr. The slope 51 and a mounting surface 52 of the second housing 12 form a space therebetween, so that the second housing 12 is open in the front direction. In the example shown in FIG. 3, the slope 51 includes a curved surface 53 that is concavely curved relative to the lower surface (bottom surface) of the second housing 12. The speaker unit 25 is disposed on the inside of the curved surface 53.

Figure 4:
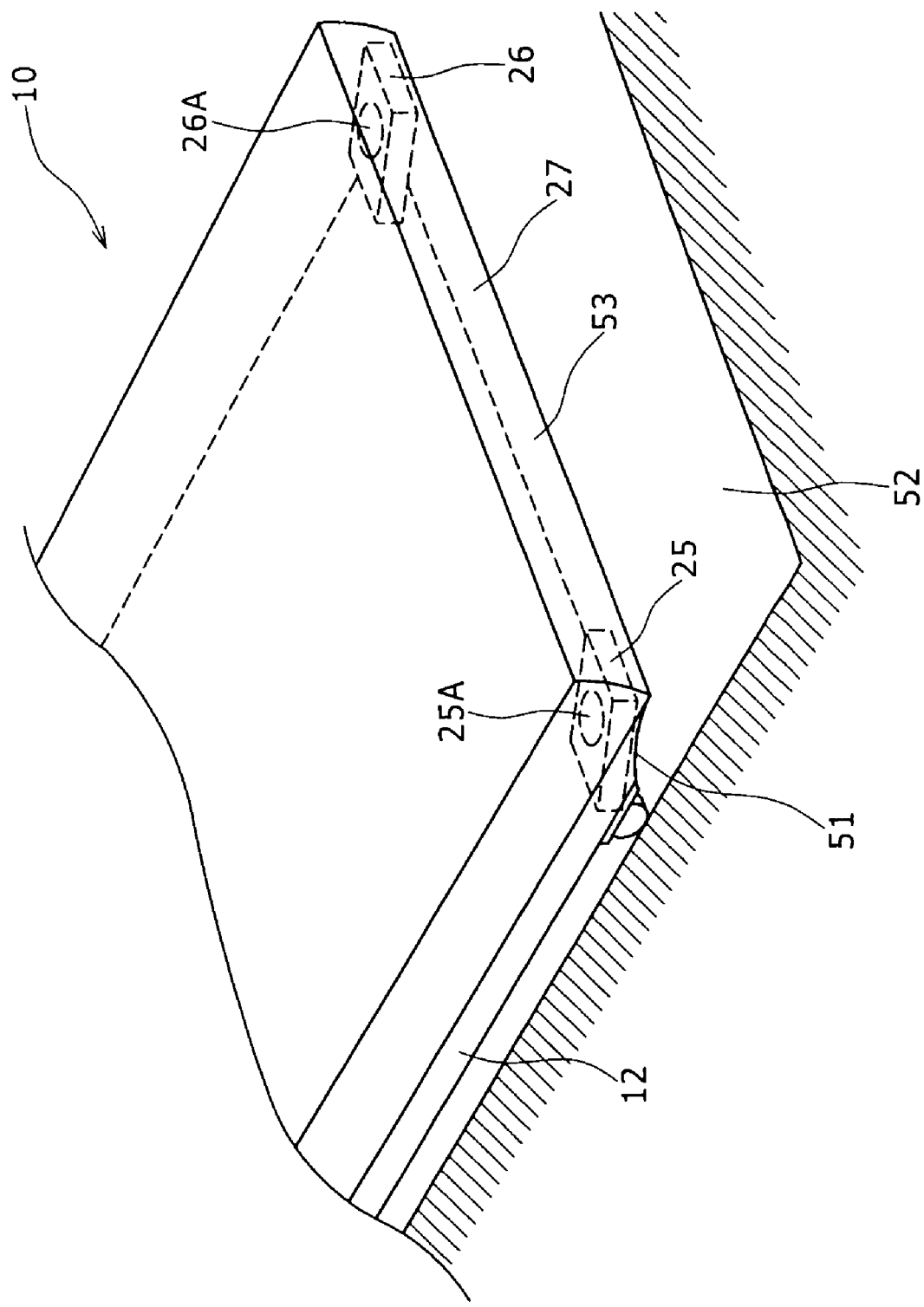
FIG. 4 is a perspective view showing housing of the notebook PC.

FIG. 4 is a perspective view showing the second housing 12.

The second housing 12 of FIG. 4 is shown so as to be seen through for convenience of explanation.

Referring to FIG. 4, the slope 51, which extends from the front surface 27 of the second housing 12 to the lower surface, forms the curved surface 53 that is a downward facing concave curvature from the front side to the rear side of the second housing 12. The curved surface 53, together with the mounting surface 52 of the second housing 12, forms a predetermined space therebetween. Further, the speaker unit 25 and the speaker unit 26 are disposed on the curved surface 53 inside the slope 51 on corresponding sides thereof.

Figure 5:
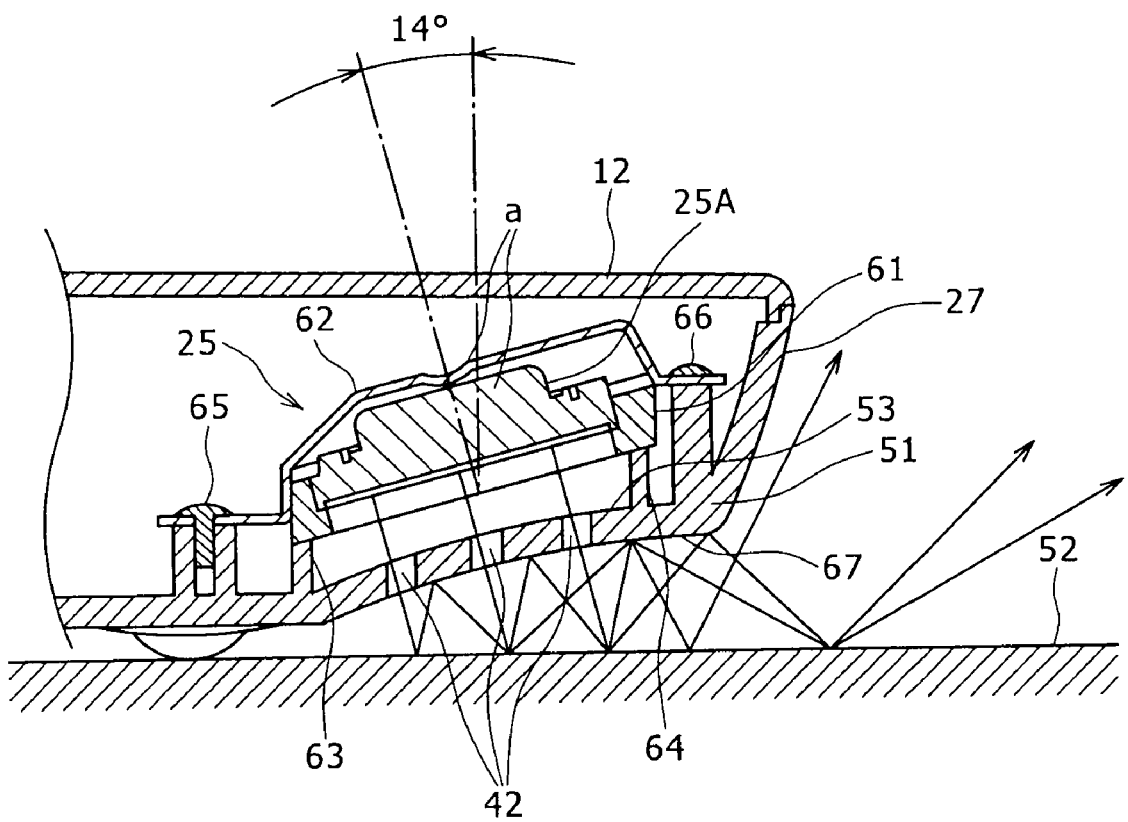
FIG. 5 is a side cross-sectional view showing the housing of the notebook PC.

Referring next to FIG. 5, the arrangements of the speaker unit 25 will be described in detail below. FIG. 5 is a left side cross-sectional view showing the second housing 12.

The speaker unit 25 shown in FIG. 5 includes the speaker 25A, a rubber cover 61, and a fixing bracket 62. As shown in FIG. 5, the curved surface 53 on the inside of the slope 51 has protrusions 63, 64. The speaker 25A surrounded by the rubber cover 61 is disposed on the protrusions 63, 64. In the example shown in FIG. 5, the speaker 25A is inclined at an angle of 14 degrees relative to the mounting surface 52. The inclined angle of the speaker 25A is not, however, limited to 14 degrees.

The fixing bracket 62, which is in contact with the speaker 25A at a point a, is placed over the speaker 25A. The fixing bracket 62 is secured to the second housing 12 with screws 65, 66. This arrangement prevents the speaker 25A from moving upwardly. Since the speaker 25A is surrounded by the rubber cover 61 and covered with the fixing bracket 62 on a back side thereof, the sound outputted from the speaker 25A can be prevented from being diffused in the back side or around the speaker 25A. Further, the speaker 25A is held in position at a point, instead of a surface, by the fixing bracket 62. This effectively suppresses occurrence of, what is called, chattering.

The sound outputted from the speaker 25A passes through the speaker grille 42 as shown by arrows. The sound is then reflected off the mounting surface 52 and the curved surface 53 before being outputted in the direction of the user at the front side.

A specific effect can be given to sound quality by changing an angle and distance of reflection of the sound outputted, which is achieved by changing an angle of inclination of the speaker 25A or a curvature or shape of the curved surface 53. Accordingly, it is preferable that an arrangement be made in which the angle of inclination of the speaker 25A or part or all of the curvature of the curved surface 53 is changed according to the sound quality of the sound outputted from the speaker 25A. This allows an effective output sound to be produced according to the sound quality.

As described heretofore, the sound outputted from the speaker 25A is more reliably outputted toward the front of the notebook PC 10 when the speaker unit 25 is disposed on the curved surface 53 of the slope 51 disposed on the lower surface of the second housing 12 that is open to the front and forms a space between the second housing 12 and the mounting surface 52. As a result, the notebook PC 10 can provide the user at the front of the notebook PC 10 with a good quality sound having a sufficiently large volume and giving the user realistic sensation.

Additionally, the notebook PC 10 has the speaker unit 25 disposed on the lower surface of the second housing 12. Accordingly, the user can listen to sound without having to open the notebook PC 10. The user may, for example, want to listen to music by starting the PC in an instant start mode using an instant start mode switch (not shown) disposed on a side surface of the second housing 12. In such cases, therefore, the user can enjoy listening to music by performing a simple operation without having to open the foldable notebook PC 10.

It is to be noted that the speaker unit 26 is configured in the same fashion as the speaker unit 25 and disposed on the curved surface 53. Detailed descriptions of the speaker unit 26 will be omitted.

Referring next to FIGS. 6A through 6D, the speaker 25A covered with the rubber cover 61 will be described in detail below.

FIG. 6A is a view showing the speaker 25A covered with the rubber cover 61 as viewed from the side of the mounting surface 52 of FIG. 5. FIG. 6B is a front view showing the speaker 25A covered with the rubber cover 61 as viewed from an arrow C in FIG. 6A. FIG. 6C is a side elevational view showing the speaker 25A covered with the rubber cover 61 as viewed from an arrow B in FIG. 6A. FIG. 6D is a cross-sectional view taken along line A-A of FIG. 6A.

Referring to FIG. 6D, a space is formed between a surface of the rubber cover 61 on the front side of the speaker 25A, that is, a mounting surface 71 disposed on the protrusion 63 or 64 of FIG. 5, and a front surface 72 of the speaker 25A covered with the rubber cover 61.

In the foregoing descriptions, the speaker units 25, 26 are disposed on ends of both sides of the curved surface 53 of the slope 51. It is to be noted, however, that the speaker units 25, 26 do not have to be disposed on the ends, as long as the units 25, 26 are disposed on the left and right sides.

FIG. 7 is a perspective view showing housing including a keyboard of a notebook PC according to a second embodiment of the present invention.

In FIG. 7, like reference numerals denote like elements in FIG. 4.

A notebook PC 100 shown in FIG. 7 includes housing 101 that includes a keyboard thereon. The housing 101 includes a slope 102 disposed on a left end thereof and a slope 103 disposed on a right end thereof such that part of a front surface 101A of the housing 101 is open to the front. A space is formed between the slope 102 and a mounting surface 52 and the slope 103 and the mounting surface 52.

A speaker unit 25 is disposed on a curved surface 104 on the inside of the slope 102. A speaker unit 26 is disposed on a curved surface 105 on the inside of the slope 103.

Sound outputted from a speaker 25A of the speaker unit 25 is reflected off not only the mounting surface 52 and a curved surface 106 on an outside of the slope 102, but also a left side surface 107 adjacent to a portion of the front surface 101A of the housing 101 not opening to the front, so that the sound is outputted to a front left direction. Similarly, sound outputted from a speaker 26A of the speaker unit 26 is reflected off not only the mounting surface 52 and a curved surface 108 on an outside of the slope 103, but also a right side surface 109 adjacent to the portion of the front surface 101A of the housing 101 not opening to the front, so that the sound is outputted to a front right direction.

As described in the foregoing, in the notebook PC 100 according to the second embodiment of the present invention shown in FIG. 7, the sound outputted from the speaker unit 25 disposed on the left of the housing 101 is outputted in the front left direction, while the sound outputted from the speaker unit 26 disposed on the right of the housing 101 is outputted in the front right direction. The user located at the front of the notebook PC 100 can therefore listen to a more stereo-like sound.

In the second embodiment of the present invention as shown in FIG. 7, the slopes 102, 103 are disposed on ends of both sides at the front side of the housing 101. It should, however, be noted that the slopes 102, 103 do not have to be disposed on the ends, as long as the slopes 102, 103 are disposed on the left and right sides at the front side.

In the embodiments of the present invention as described heretofore, each of the slopes 51, 102, 103 is formed as a curved surface. The slopes 51, 102, 103 may nonetheless be formed as a flat surface. Or, the left side surface 107 may be formed as a curved surface continuing into the curved surface 106, and the right side surface 109 may be formed as a curved surface continuing into the curved surface 108.

It is to be further noted that the present invention is applicable to, in addition to the notebook PC, personal computers of a type other than the notebook, portable telephones, portable audio players, and related electronic apparatuses.

It should be understood that the present invention is not limited to the embodiments described heretofore, but also encompasses those changes falling within the spirit and scope of the appended claims.

We claim:

1. A portable electronic apparatus, comprising:
    a housing including
        an upper surface;
        a flat lower surface substantially parallel to a mounting surface whereon the housing is placed and substantially parallel to the upper surface;
        an output device configured to output sound;
        a sloped surface extending between the flat lower surface and the upper surface;
    wherein the output device is inclined relative to the mounting surface, and the sloped surface includes one or more openings for transmitting the sound outputted by the output device toward the mounting surface at different respective angles and distances with respect to the mounting surface.

2. The portable electronic apparatus according to claim 1, wherein the sloped surface forms a space between the sloped surface and the mounting surface and orients the sound to be transmitted through the one or more openings.

3. The portable electronic apparatus according to claim 1, wherein the sloped surface is configured to reflect the sound emitted by the output device and transmitted through the one or more openings.

4. The portable electronic apparatus according to claim 1, further comprising:
    a second sloped surface adjacent to and abutting with an inside edge of the sloped surface, said inside edge being closer to a center of said portable electronic device than an outer edge of said sloped surface.

* * * * *